United States Patent [19]

Hayatake et al.

[11] Patent Number: 5,734,978
[45] Date of Patent: Mar. 31, 1998

[54] MOBILE TELEPHONE WITH FUNCTION TO PREVENT ILLEGAL USE AND METHOD AND SYSTEM FOR PREVENTING ILLEGAL USE OF MOBILE TELEPHONE USING THE FUNCTION

[75] Inventors: Tetsuo Hayatake; Kazuya Hashimoto, both of Tokyo, Japan

[73] Assignee: NEC Corporation, Tokyo, Japan

[21] Appl. No.: 573,132

[22] Filed: Dec. 15, 1995

[30] Foreign Application Priority Data

Dec. 28, 1994 [JP] Japan .................. 6-337475

[51] Int. Cl.$^6$ ................................. H04M 11/00
[52] U.S. Cl. .......................... 455/410; 455/411
[58] Field of Search ...................... 455/410, 411, 455/403; 340/825.31, 825.34, 825.44, 825.5

[56] References Cited

U.S. PATENT DOCUMENTS

| | | | |
|---|---|---|---|
| 5,257,412 | 10/1993 | Tomioka et al. | 455/411 |
| 5,440,758 | 8/1995 | Grube et al. | 455/411 |
| 5,444,764 | 8/1995 | Galecki | 455/411 |
| 5,517,554 | 5/1996 | Mitchell et al. | 455/411 |
| 5,555,551 | 9/1996 | Rudukas et al. | 455/410 |
| 5,600,708 | 2/1997 | Meche et al. | 455/411 |
| 5,646,977 | 7/1997 | Koizumi | 455/41 |
| 5,659,595 | 8/1997 | Chanu et al. | 455/41 |

FOREIGN PATENT DOCUMENTS

| | | | |
|---|---|---|---|
| 3441724 | 5/1986 | Germany | 455/410 |
| 2196532 | 8/1990 | Japan . | |
| 369459 | 11/1991 | Japan . | |

*Primary Examiner*—Dwayne Bost
*Assistant Examiner*—Tracy M. Legree
*Attorney, Agent, or Firm*—Whitham, Curtis, Whitham & McGinn

[57] ABSTRACT

In order to prevent illegal use of a mobile telephone, a call is repeatedly originated from a telephone or base station to the mobile telephone over a wireless path. When the call is received by the mobile telephone over the wireless path so that a communication channel is established, a destruction code including a cryptographic data is transmitted from the telephone or base station to said mobile telephone. The mobile telephone receives the destruction code and compares the cryptographic data of the received destruction code with a preset data stored in the mobile telephone to determine whether both the data are matched. When it is determined that both the data are matched, the mobile telephone destroys a telephone functioning information stored in the mobile telephone and necessary for performing communication.

14 Claims, 4 Drawing Sheets

Fig. 2A
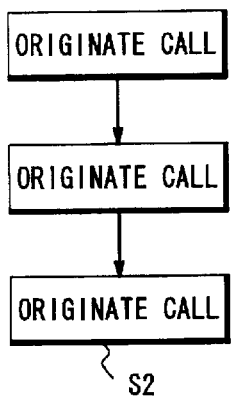
Fig. 2B
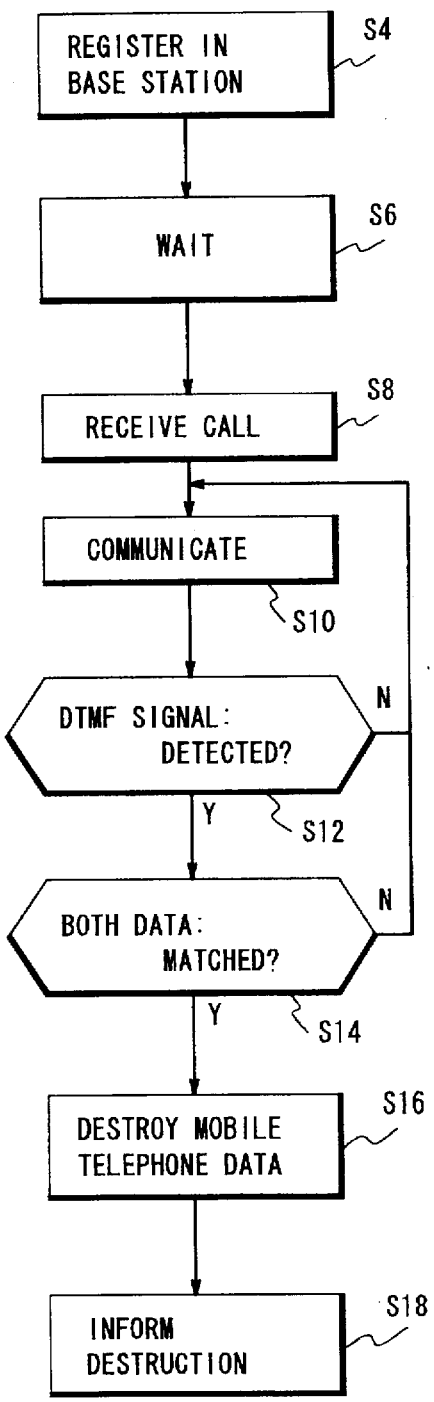
Fig. 2C
TRANSMIT CRYPTOGRAPHIC NUMBER (DTMF SIGNAL) — S20

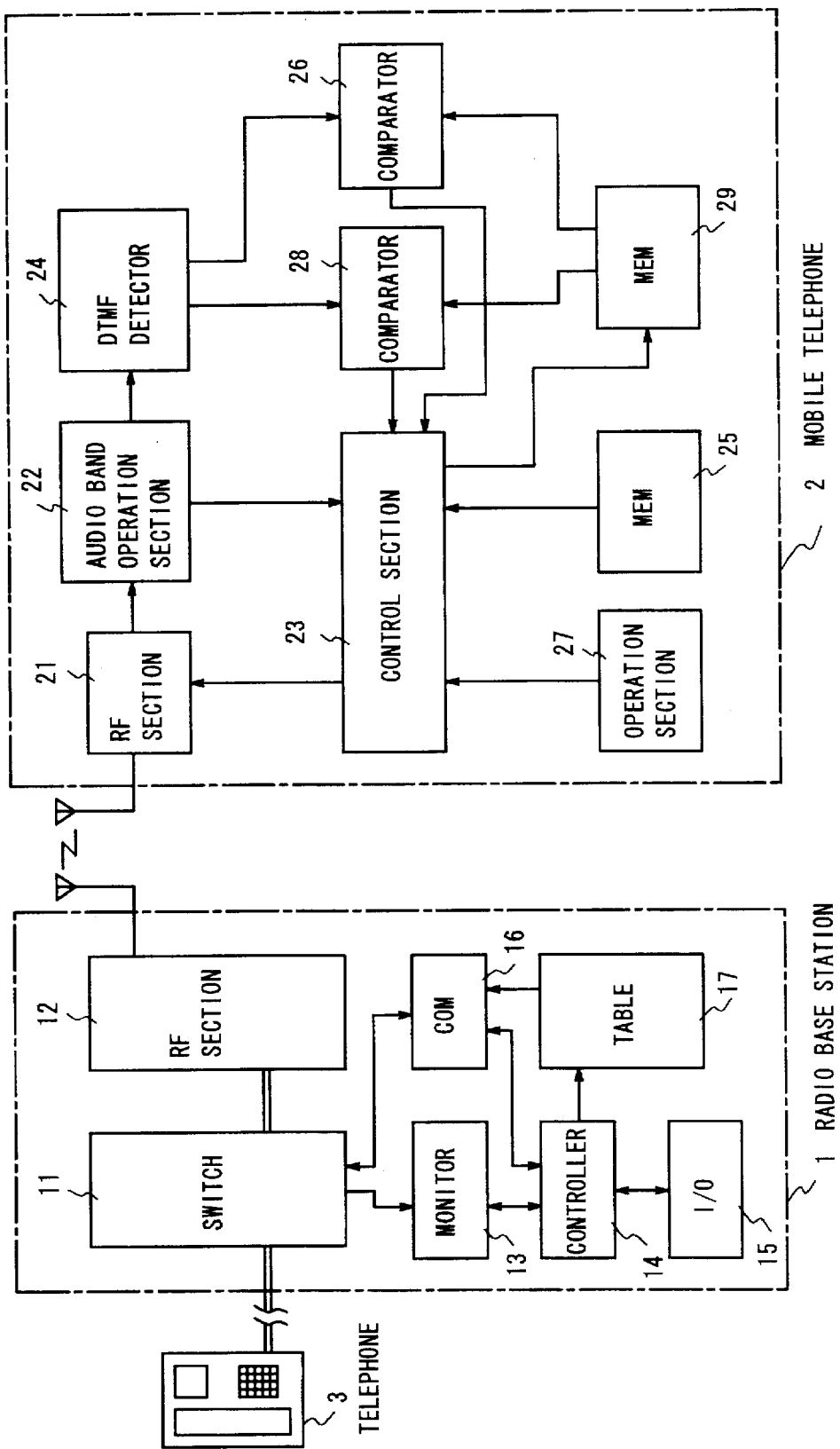

MOBILE TELEPHONE WITH FUNCTION TO PREVENT ILLEGAL USE AND METHOD AND SYSTEM FOR PREVENTING ILLEGAL USE OF MOBILE TELEPHONE USING THE FUNCTION

BACKGROUND OF THE INVENTION

1. Field of the Invention

The present invention relates to a mobile telephone with a function to prevent illegal use and a method and system for preventing illegal use of the mobile telephone using the function.

2. Description of Related Art

Mobile telephones or cellular phones are now used widely. As the number of such mobile telephones increases, the number of crimes that mobile telephones are stolen also increases. If a mobile telephone is stolen and illegally used, expensive charge would be imposed to the original owner of the stolen mobile telephone. Accordingly, when a mobile telephone is stolen, it is desirable that illegal use of the mobile telephone can be prevented.

As the measurements for preventing the illegal use of a mobile cellular telephone when it is stolen, there was the technique in which an electronic lock code was provided to the mobile telephone. In this technique, a user of the mobile telephone needs to release the lock code each time the user wants to call anybody and to lock each time the communication is ended. Thus, it is very troublesome to perform the locking and unlocking operation. For this reason, many users use the mobile telephones without locking them. Therefore, if the mobile telephone is stolen, the illegal use cannot be prevented.

There have been made many proposals, i.e., measurements of a higher level compared to the above measurements. The technique is disclosed in Japanese Examined Patent Disclosure (JP-B-Hei3-69459) in which a wireless selective call receiver has a function to destroy the receiving function when it receives a specific code. As a result, the illegal use of the receiver is prevented. However, in the reference, there is a problem that if the specific code is transmitted using an erroneous telephone number, another receiver having the telephone number is destroyed in the receiving function.

Further, in Japanese Laid Open Patent Disclosure (JP-A-Hei2-196532), for example, it is disclosed that an ID number of a stolen mobile telephone is registered in a radio base station and when a call from the stolen mobile telephone is received, the base station continues to transmit a data delete signal for deleting a data necessary for the telephone function. As a result, the illegal use of the stolen mobile telephone by another person can be prevented.

However, in the technique, the data delete signal is transmitted only when the call from the stolen telephone is received. The data necessary for the telephone function cannot be actively deleted for preventing the illegal use. Further, each time a call including an ID number is received, the base station must determine whether the received ID number is coincident with any one of the ID numbers of stolen mobile telephones registered in the base station. This determination is very head load to the base station. This operation would influence to the original operation of the base station.

SUMMARY OF THE INVENTION

An object of the present invention is to provide a mobile telephone in which the illegal use can be prevented without so much increasing the load of the base station and without preventing the smooth operation of the network.

Another object of the present invention is to provide a method and system for preventing illegal use of a mobile telephone without so much increasing the load of the base station and without preventing the smooth operation of the network.

Further another object of the present invention is to provide a method and system for preventing illegal use of a mobile telephone by actively originating a call to the mobile telephone.

In order to achieve an aspect of the present invention, in a method of preventing illegal use of a mobile telephone, a call to the mobile telephone repeatedly is originated over a wireless path, and when the call is received by the mobile telephone over the wireless path so that a communication channel is established, a destruction code including a cryptographic data is transmitted to the mobile telephone. The mobile telephone receives the destruction code and compares the cryptographic data of the received destruction code with a preset data stored in the mobile telephone to determine whether both the data are matched. When it is determined that both the data are matched, the mobile telephone destroys a telephone information stored in the mobile telephone. The telephone information is information necessary for performing communication. When the preset data is destroyed, it is desirably informed to a telephone or base station.

It is desirable that the call is repeatedly originated from a telephone of a push phone type using an automatic repeat function of the telephone via a switch of the base station. In this case, the destruction code is inputted and transmitted from the telephone to the mobile telephone via the switch.

Alternatively, the call may be originated from the base station. In this case, the base station (a) monitors a traffic on a switch in a base station to determine whether a traffic level is lower than a threshold level, (b) reads out the cryptographic data and a telephone number associated with the cryptographic data, (c) produces the destruction code from the read out cryptographic data and originating a call from the base station to the mobile telephone via the switch based on the read out telephone number to transmit the produced destruction code to the mobile telephone via the switch, and (d) sequentially repeats the operations (b) and (c) for the cryptographic data which are registered in a table in advance, while it is determined that the traffic level is lower than the threshold level. In this case, if it is informed from the mobile telephone to the base station that the preset data has been destroyed, the cryptographic data and the associated telephone number is deleted from the table in the base station.

In either case that the call is originated from the telephone or the base station, the destruction code may be transmitted to the mobile telephone in a Dual Tone Multi Frequency (DTMF) signal form. The mobile telephone detect the cryptographic data from the DTMF signal by a DTMF detector.

In order to achieve another aspect of the present invention, it is preferable that a mobile telephone having an illegal use preventing function, is composed of a storage section for storing a telephone information necessary for performing communication and a preset data, a first section for receiving a destruction code when a wireless communication channel is established and comparing the cryptographic data of the received destruction code with the preset data stored in the storing section to determine whether both the data are matched, and a second section for destroying the telephone information stored in the storing section when it is determined that both the data are matched.

Further, in order to achieve still another aspect of the present invention, it is preferable that a system for preventing illegal use of a mobile telephone, including a base station which is composed of a switch, a storage section for storing a plurality of sets of telephone number and cryptographic data, a destruction instructing section for repeatedly originating a call to the mobile telephone over a wireless path via the switch in accordance with the traffic load on the switch, and for transmitting a destruction code including the cryptographic data for the mobile telephone via the switch, such that a telephone information of the mobile telephone is destructed based on the cryptographic data, when the call is received by the mobile telephone so that a communication channel is established over the wireless path.

BRIEF DESCRIPTION OF THE DRAWINGS

FIGS. 2A to 2C are flow charts for explaining the operation of the system shown in FIG. 1, wherein FIGS. 2A and 2C are the flow charts for explaining the operation of a telephone and FIG. 2B is the flow chart for explaining the operation of the mobile telephone;

FIG. 3 is a block diagram of the system structure of an illegal user preventing system including a mobile telephone according to a second embodiment of the present invention.

DESCRIPTION OF THE PREFERRED EMBODIMENT

Next, an illegal use preventing system of a mobile telephone according to the first embodiment of the present invention will be described below with reference to the accompanying drawings.

Figure 1:
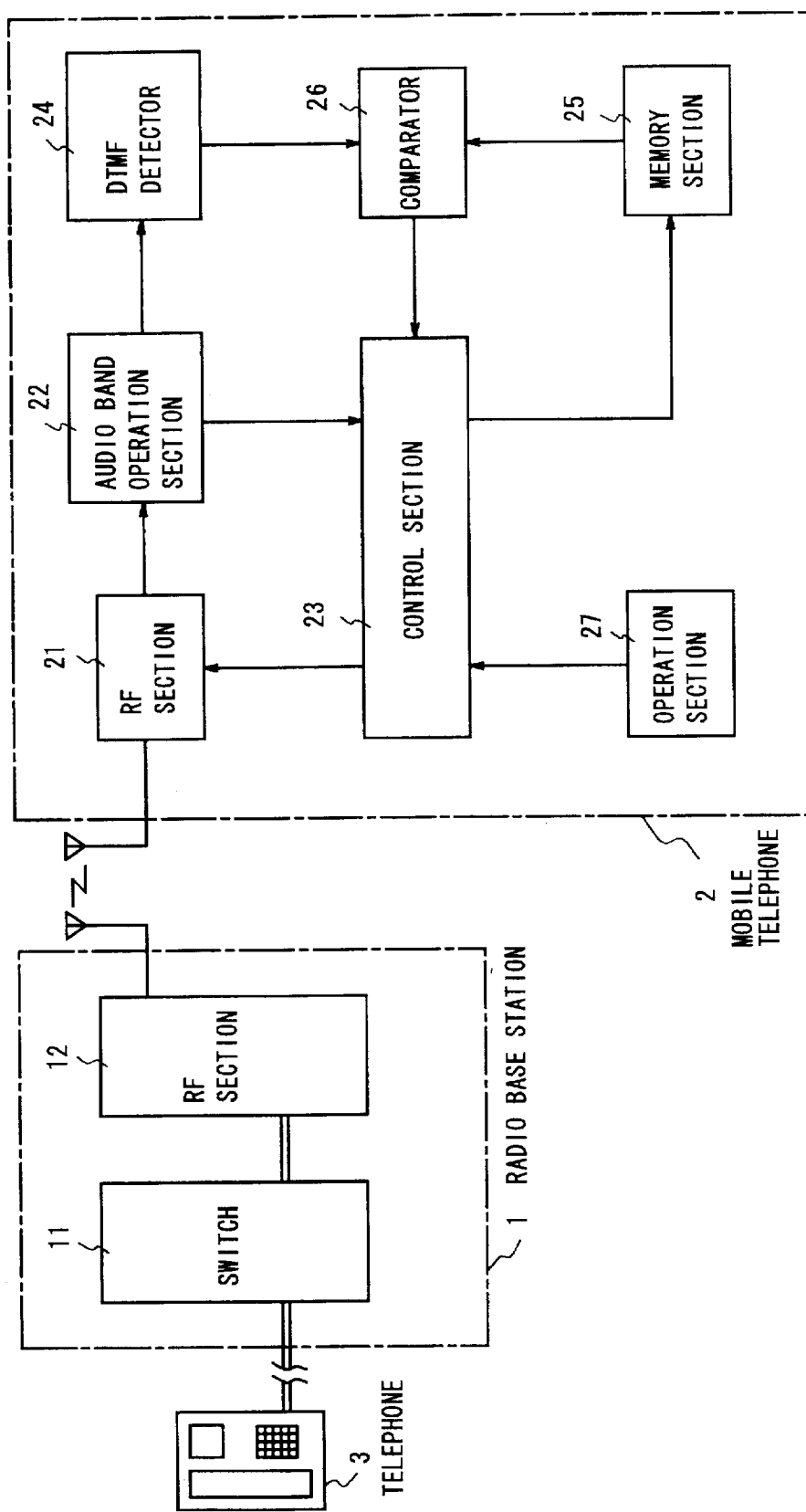
FIG. 1 is a block diagram of the system structure of an illegal user preventing system including a mobile telephone according to an embodiment of the present invention.

FIG. 1 is a block diagram of the illegal use preventing system of a mobile telephone according to the first embodiment. Referring to FIG. 1, the illegal use preventing system is composed of a radio base station 1, a portable mobile telephone 2, and a telephone 3. The radio base station 1 is connected to the mobile cellular telephone 2 by a wireless transmission path and or channel and to the telephone by a wire transmission path. However, the telephone 3 may be connected to the radio base station 2 by the wireless transmission path. The telephone 3 is desirably of a push phone type. The radio base station 1 is composed of a switch 11 connected to a public telephone line network (not shown), for switching or exchanging a signal inputted thereto, and a wireless transceiver (RF section) 12 connected to the switch 11, for transmitting and receiving a wireless signal. The mobile telephone 2 is composed of a RF section 21 connected to an antenna which is connected to the radio base station 1 by a wireless transmission path, an audio band operation section 22 for performing modulation or demodulation of a audio band signal inputted to or outputted from the RF section 21, a control section 23 for controlling the whole of the mobile telephone, a DTMF detector 24 for detecting a DTMF signal from the output of the audio band operation section 22 and detecting a cryptographic number from the DTMF signal, a memory section 25 for storing a program for the whole operation of the mobile telephone, telephone functioning data such as an ID number of the mobile telephone for making the mobile telephone available, and a cryptographic number used to initiate the destruction operation of at least a part of the data, a comparator 26 for comparing the cryptographic number outputted from the DTMF detector 24 with the cryptographic number stored in the memory section 25, and an operation section 27 having a numeral keys and various function keys, for externally inputting an operation signal. A device available from Fujitsu, MB87057, can be used as the DTMF detector.

FIGS. 2A to 2C are flow charts for explaining the operation of the illegal use preventing system according to the first embodiment of the present invention when the mobile telephone is stolen. In order to prevent illegal use, a user as a legal owner of the mobile telephone 2 needs to input a string of arbitrary numerical digits which only the user knows, as the cryptographic number from the operation section 27 of the mobile telephone 2 before the mobile telephone 2 is stolen. The cryptographic number is stored in the memory section 25 by the control section 23. The cryptographic number is a unique number which is used in destruction of the telephone functioning data of the mobile cellular phone when the mobile cellular phone is stolen.

In a case that the mobile telephone 2 is stolen, referring to FIG. 2A, an authorized person such as the legal owner or attorney of the legal owner dials at an appropriate timing the telephone number of the mobile cellular phone 2 from a telephone 3 in a step S2. This call is not always successful. This is because there is a case that an illegal owner of the stolen mobile telephone does not turn on the stolen mobile telephone or that the illegal owner is not in a service area of the mobile cellular telephone system. However, it is easy to repeat the originating of the call using an automatic repeat dialling feature until the channel is established between the telephone 3 and the stolen mobile telephone 2.

If the stolen mobile telephone 2 has been turned on and the initial registering operation is completed in a step S4, the stolen mobile telephone 2 is in the waiting state of a step S6. At this time, if the call is originated from the telephone 3 to the stolen mobile telephone 2, the call is successfully received by the stolen mobile telephone 2 in a step S8, so that a communication channel is established between the telephone 3 and the stolen mobile telephone 2. In this case, the authorized person immediately inputs the cryptographic number from the telephone 3 in step S20. The cryptographic number is transmitted together with another specific data bits in the form of a wireless DTMF signal to the stolen mobile telephone 2 via the switch 11 and the RF section 12 of the radio base station 1 in a step S10. The transmission of wireless DTMF signal is simply performed only by operating numeral keys of a push button type of telephone 3 corresponding to the cryptographic number.

The wireless signal from the telephone 3 is received by the RF section 21 of the stolen mobile cellular phone 2. The received wireless signal is demodulated by the audio band operation processing section 22. When finding the specific data bits in the received wireless signal, the section 22 informs it to the control section 23. The control section 23 controls the memory section 25 to output the cryptographic number stored in the section 25 to the comparator 26. The DTMF detector 24 detects a DTMF signal from the demodulated signal and detects the cryptographic number from the detected DTMF signal in a step S12. The cryptographic number detected by the DTMF detector 24 is compared with the cryptographic number outputted from the memory section 25 by the comparator 26 in a step S14. When both the cryptographic numbers are coincident, the comparator 26 outputs a telephone functioning data destroy signal to the control section 23 in a step S16. In response to the destroy signal, the control section 23 destroys the telephone functioning data stored in the memory section 25. In this case, a part of the telephone functioning data may be destroyed or whole of the telephone functioning data may be destroyed. The telephone functioning data is data necessary for performing the telephone functions. After the destroying operation is completed, the control section 23 transmits a destruction end signal to the telephone 3 via the audio band operation section 22 and the RF section 21 through the RF section 12 and the switch 11. Thereby, the legal owner of the stolen mobile telephone 2 can confirm that the mobile telephone 2 has been make unavailable.

As a method for destroying the telephone functioning data stored in the memory section 25, a program for destroying the telephone functioning data may be built in the memory section 25 and executed by the control section 23 in response to the destroy signal from the comparator 26. Alternatively, as described in the above reference, JP-B-hei3-69459, a method may be employed as a data destroy method in which a large mount of current is flowed through a fuse built in a line between the memory section 25 and the control section 23 under the control of the control section 23 such that the fuse is broken. As a result, the memory section 25 is disconnected from the control section 23 and the any data including the telephone functioning data cannot be read out from the memory section 25. In either case, the telephone functions are completely stopped in the mobile telephone 2 by destroying the telephone functioning data.

In this manner, according to the illegal use preventing system of the first embodiment, in a case that the mobile telephone is stolen, it is sufficient for making the stolen mobile telephone unavailable that the owner originates a call to the stolen mobile telephone and then transmits the cryptographic number to the stolen mobile telephone when the call is received. Therefore, even if the number of stolen mobile telephone is increased, there is no case where the smooth operation of the network is prevented by extremely increasing the load of the base station or by occupying most of the messages from the base station.

In the first embodiment, the cryptographic number used to destroy the telephone functioning data is stored in the memory section 25 in which a program and ID number are also stored. However, a dedicated storage section may be provided to store the cryptographic number. For instance, since there are many cases where the program and ID number are stored in an EEPROM, the cryptographic number may be stored in a RAM. In this case, the owner of the mobile cellular phone can arbitrarily change the cryptographic number. However, since the object of the present invention is to prevent illegal use, the storage means is desirable to be a PROM in which the cryptographic number cannot be easily rewritten.

Next, the illegal use preventing system of a mobile telephone according to the second embodiment of the present invention will be described below.

FIG. 3 is a block diagram of the illegal use preventing system of a mobile telephone according to the second embodiment. In FIG. 3, the same components as shown in FIG. 1 are assigned with the same reference numerals. Referring to FIG. 3, the illegal use preventing system is composed of the radio base station 1, the portable mobile cellular telephone 2, and the telephone 3, similar to the first embodiment. The radio base station 1 is connected to the mobile cellular telephone 2 by a wireless transmission path and or channel and to the telephone 3 by a wire transmission path. However, the telephone 3 may be connected to the radio base station 2 by the wireless transmission path.

The radio base station 1 is composed of a switch 11 for switching a signal, a wireless transceiver (RF section) 12 for transmitting and receiving a wireless signal, a monitor 13 for monitoring the load of the switch 11 to determine whether the load level of the switch 11 is lower than a threshold level, a table 17 for storing a plurality of sets of cryptographic number and telephone number of the stolen mobile telephone and telephone number of the telephone 3, an input/output (I/O) section 15 for inputting the set to register in the table 17, a communication section (COM) 16 for originating a call and transmitting a cryptographic number via the switch 11 and for receiving an information via the switch 11, and a controller 14 for controlling the monitor 13, input/output section 15, table 17, and communication section 16.

The mobile telephone 2 is constituted in the same manner as in the first embodiment. That is, the mobile telephone 2 is composed of an operation section 27 having a numeral keys and various function keys, for externally inputting an operation signal, a RF section 21 connected to an antenna which is connected to the radio base station 1 by a wireless transmission path, an audio band operation section 22 for performing modulation or demodulation of a audio band signal inputted to or outputted from the RF section 21, a control section 23 for controlling the whole of the mobile telephone, a DTMF detector 24 for detecting a DTMF signal from the output of the audio band operation section 22 and detecting a cryptographic number from the DTMF signal. In the second embodiment, a memory section 25 stores only a program for the whole operation of the mobile telephone. Telephone functioning data such as an ID number of the mobile telephone for making the mobile telephone available, and a cryptographic number are stored in a memory section 29. Also, in the embodiment, two comparators 26 and 28 are provided. The comparator 26 compares a specific code outputted from the DTMF detector 24 with the specific code stored in the memory section 29 and the comparator 28 compares the cryptographic number outputted from the DTMF detector 24 with the cryptographic number stored in the memory section 29.

Next, the operation of the illegal use of the mobile telephone according to the second embodiment will be described with reference to FIGS. 2A to 2C and 4. In this case, the processing shown in FIGS. 2A and 2C is performed by the radio base station 1. First, as in the first embodiment, the a user as a legal owner of the mobile telephone 2 needs to input a string of arbitrary numerical digits which only the user knows, as the cryptographic number from the operation section 27 of the mobile telephone 2 before the mobile telephone 2 is stolen. The cryptographic number is stored in the memory section 29 by the control section 23. The cryptographic number is a unique number which is used in destruction of the telephone functioning data of the mobile cellular phone when the mobile cellular phone is stolen. A specific code is also stored in the memory section 29 in the manufacturing process of the mobile telephone 2.

When the mobile telephone 2 is stolen, the legal owner of the mobile telephone 2 informs the fact to the radio base station 1. An authorized person of the base station 1 inputs the cryptographic number and telephone number of the stolen mobile telephone 2 and a telephone number of the telephone 3 of the user from the input/output section 15 to register these data in the table 17 as a set.

Figure 4:
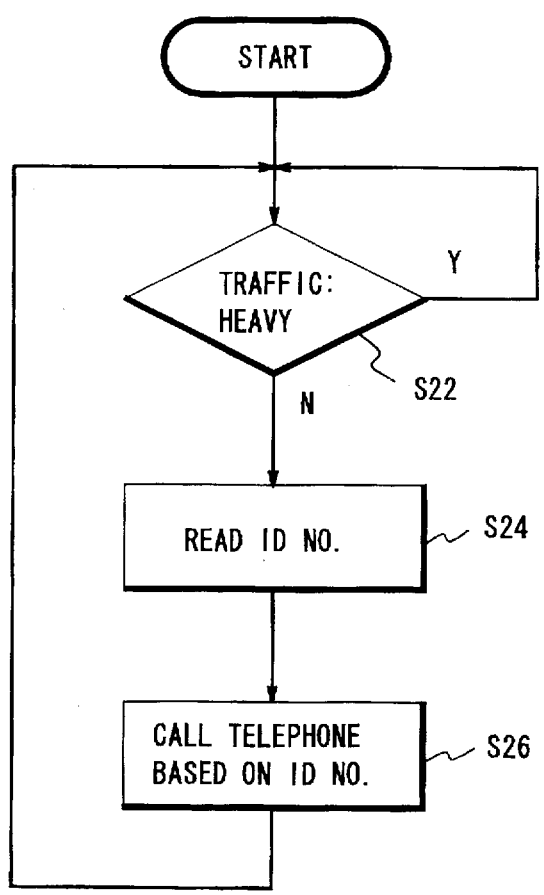
FIG. 4 is a flow chart for explaining the operation of the base station in the system shown in FIG. 3.

Referring to FIG. 4, the monitor 13 monitors the traffic load on the switch 11 in a step S22. When it is determined that the traffic load level is lower than a threshold level, the monitor 13 informs it to the controller 14. The controller 14 controls the table 17 to output a set of telephone number and cryptographic number to the communication section 16 in a step S24. The communication section 16 originates a call to the stolen mobile telephone 2 via the switch 11 based on the telephone number in a step S26. The calling operation is repeated for a predetermined time period as shown in the step S2 of FIG. 2A. This is because the call is not always successful.

If the stolen mobile telephone 2 has been turned on and the initial registering operation is completed in a step S4, the stolen mobile telephone 2 is in the waiting state of a step S6. At this time, if the call is originated from the radio base station 1 to the stolen mobile telephone 2, the call is successfully received by the stolen mobile telephone 2 in a step S8, so that a communication channel is established between the radio base station 1 and the stolen mobile telephone 2. In this case, the communication section 16 adds the specific code to the cryptographic number to produce cryptographic data and transmits it to the stolen mobile telephone 2 via the switch 11 in the form of a wireless DTMF signal in the step S20.

The wireless signal from the radio base station 1 is received by the RF section 21 of the stolen mobile cellular phone 2 in the step S20. The received wireless signal is demodulated by the audio band operation processing section 22. When finding the specific code in the received wireless signal, the section 22 supplies it to comparator 26. The control section 23 controls the memory section 29 to output the specific code and the cryptographic number stored in the section 29 to the comparators 26 and 28, respectively. The DTMF detector 24 detects a DTMF signal from the demodulated signal and detects the specific code and cryptographic number from the detected DTMF signal in a step S12. The specific code and cryptographic number detected by the DTMF detector 24 are supplied to the comparators 26 and 28 in a step S14. The comparator 26 compares both the specific codes with each other and, when both the specific codes are matched, informs it to the control section 23. Also, the comparator 28 compares both the cryptographic numbers with each other and, when both the specific codes are matched, informs it to the control section 23. When the coincidence is informed from the comparators 26 and 28, the control section 23 executes a destroy program stored in the memory section 25 to destroy the telephone functioning data stored in the memory section 29 in the step S16. In this case, a part of the telephone functioning data may be destroyed or whole of the telephone functioning data may be destroyed. The telephone functioning data is data necessary for performing the telephone functions. After the destroying operation is completed, the control section 23 transmits a destruction end signal to the radio base station 1 via the audio band operation section 22 and the RF section 21 through the RF section 12 and the switch 11. When either one of the comparators 26 and 28 does not indicate the coincidence, the step S10 is executed again.

In the radio base station 1, the destruction end signal is received via the switch 11 by the communication section 16, and it is informed to the controller 14. The controller 14 reads the telephone number of the telephone 3 from the table 17. The communication section 16 originates a call to the telephone 3 via the switch 11, and when the call is received, informs to the legal owner of the stolen mobile telephone 2 that the telephone function of the stolen mobile telephone 2 is destroyed. The controller 14 also outputs to the input/output section 15 that the telephone function of the stolen mobile telephone 2 is destroyed. Further, the controller 14 deletes the set of cryptographic number, telephone number of the stolen mobile telephone 2, and telephone number of the telephone 3 from the table 17.

After the call is originated in the step S26, if the traffic load level is increased to exceed the threshold level, the read operation of the next set of cryptographic number and telephone number is waited until the traffic load level is decreased again lower than the threshold level. If the traffic load level is remained lower than the threshold level, the sets of cryptographic number and telephone number are sequentially read to originate calls.

As described above, according to the second embodiment, without preventing the smooth operation of the network by the radio base station, the telephone functioning data of the stolen mobile telephone can be destroyed or the function of the stolen mobile telephone can be invalidated.

As described above, according to the present invention, even if the number of stolen mobile cellular phones is increased, there is caused no problem that the normal operation of the network is prevented by extremely increasing the load of the base station or by occupying most of messages of the base station.

Further, the stolen mobile telephone includes a DTMF detector for detecting a DTMF signal from a signal received by a RF section and detecting the cryptographic number from the DTMF signal. Therefore, the legal owner can prevent the illegal use of the stolen mobile cellular phone only by keying the cryptographic number from a push phone which is in a state connected to the stolen mobile cellular phone.

In addition, since a program for destroying the telephone functioning data is stored in the mobile cellular phone, if the program is executed by a control section, the telephone functioning data stored in the memory section can be instantaneously destroyed. Also, the cryptographic number may be identical to the ID number.

What is claimed is:

1. A method of preventing illegal use of a mobile telephone, comprising the steps of:
   repeatedly originating a call to said mobile telephone over a wireless path;
   when the call is received by said mobile telephone over the wireless path so that a communication channel is established, transmitting a destruction code including a cryptographic data to said mobile telephone;
   said mobile telephone receiving the destruction code and comparing the cryptographic data of the received destruction code with a preset data stored in said mobile telephone to determine whether both the data are matched; and
   said mobile telephone destroying a telephone functioning information stored in said mobile telephone when it is determined that both the data are matched, said telephone functioning information being information necessary for performing communication.

2. A method according to claim 1, further comprising the step of issuing from said mobile telephone information indicating that the telephone functioning information has been destroyed.

3. A method according to claim 1, wherein said call is repeatedly originated from a telephone using an automatic repeat function of the telephone via a switch of a base station, and the destruction code is inputted and transmitted from said telephone to said mobile telephone via the switch.

4. A method according to claim 3, wherein said telephone is a push phone and the destruction code is transmitted to said mobile telephone in a Dual Tone Multi Frequency (DTMF) signal form, and wherein said mobile telephone includes a DTMF detector for detecting the cryptographic data from the DTMF signal.

5. A method according to claim 1, wherein said step of repeatedly originating a call comprises the steps of:

(a) monitoring a traffic on a switch in a base station to determine whether a traffic level is lower than a threshold level;

(b) reading out the cryptographic data and a telephone number associated with the cryptographic data;

(c) producing the destruction code from the read out cryptographic data and originating a call from the base station to said mobile telephone via the switch based on the read out telephone number to transmit the produced destruction code to said mobile telephone via the switch; and (d) sequentially repeating said steps (b) and (c) for the cryptographic data which are registered in a table in advance, while it is determined that the traffic level is lower than the threshold level.

6. A method according to claim 5, further comprising the steps of:

informing that the preset data has been destroyed from said mobile telephone to the base station; and deleting the cryptographic data and the associated telephone number from the table in the base station.

7. A method according to claim 5, wherein the destruction code is transmitted to said mobile telephone in a Dual Tone Multi Frequency (DTMF) signal form, and wherein said mobile telephone includes a DTMF detector for detecting the cryptographic data from the DTMF signal.

8. A mobile telephone having an illegal use preventing function, comprising:

a storage section for storing a telephone functioning information necessary for performing communication and a preset data;

a first section for receiving a destruction code when a wireless communication channel is established and comparing the cryptographic data of the received destruction code with the preset data stored in the storing section to determine whether both the data are matched; and a second section for destroying the telephone functioning information stored in said storing section when it is determined that both the data are matched.

9. A mobile telephone according to claim 8, wherein a first section comprises:

a receiving section for receiving a destruction code signal;

a detecting section for detecting the cryptographic data from the received destruction code signal; and a comparing section for comparing the detected cryptographic data with the preset data stored in the storing section to determine whether both the data are matched.

10. A mobile telephone according to claim 9, wherein the destruction code signal is of a Dual Tone Multi Frequency (DTMF) signal type and said detecting section includes a DTMF detector.

11. A system according to claim 8, further comprising means for issuing an information indicating that the telephone functioning information has been destroyed.

12. A system for preventing illegal use of a mobile telephone, comprising a base station including:

a switch;

storage means for storing a plurality of sets of telephone number and cryptographic data;

destruction instructing means for repeatedly originating a call to said mobile telephone over a wireless path via the switch in accordance with a traffic load on the switch, and for transmitting a destruction code including the cryptographic data for said mobile telephone via the switch, such that a telephone functioning information of said mobile telephone is destructed based on the cryptographic data, when the call is received by said mobile telephone so that a communication channel is established over the wireless path.

13. A system according to claim 12, wherein said destruction instruction means comprises:

monitoring means for monitoring a traffic on the switch to determine whether a traffic level is lower than a threshold level;

reading means for sequentially reading out the plurality of sets of cryptographic data and telephone number for said mobile telephone from said storage means while it is determined that the traffic level is lower than the threshold level;

calling means for originating a call to said mobile telephone via the switch based on the read out telephone number; and transmitting means for producing the destruction code from the read out cryptographic data and transmitting the produced destruction code to said mobile telephone via the switch.

14. A system according to claim 13, further comprising deleting means for deleting the set of cryptographic data and telephone number for said mobile telephone from said storage means when it is informed from said mobile telephone that the telephone functioning information has been destroyed.

* * * * *